United States Patent
Ishibashi (10) Patent No.: US 8,901,889 B2
(45) Date of Patent: Dec. 2, 2014

(54) DISCHARGE CONTROL APPARATUS AND DISCHARGE CONTROL METHOD

(75) Inventor: Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 396 days.

(21) Appl. No.: 13/314,822

(22) Filed: Dec. 8, 2011

(65) Prior Publication Data

US 2012/0161714 A1  Jun. 28, 2012

(30) Foreign Application Priority Data

Dec. 24, 2010  (JP) ................ P2010-287548

(51) Int. Cl.
 *H02J 7/00* (2006.01)
 *H01M 10/44* (2006.01)

(52) U.S. Cl.
 CPC .............. *H02J 7/0063* (2013.01); *H01M 10/44* (2013.01); *H02J 7/0031* (2013.01); *H02J 2007/0067* (2013.01)
 USPC ............ 320/127; 320/118; 320/135; 320/136

(58) Field of Classification Search
 CPC ............ H02J 2007/0067; H02J 7/0063; H02J 7/0031; H01M 10/44
 USPC ................... 320/127, 135, 118, 136
 See application file for complete search history.

(56) References Cited

U.S. PATENT DOCUMENTS

| | | | | | |
|---|---|---|---|---|---|
| 5,563,493 | A | * | 10/1996 | Matsuda et al. | 320/124 |
| 5,652,499 | A | * | 7/1997 | Morita et al. | 320/112 |
| 5,656,915 | A | * | 8/1997 | Eaves | 320/118 |
| 5,825,155 | A | * | 10/1998 | Ito et al. | 320/118 |
| 5,945,809 | A | * | 8/1999 | Inaba et al. | 320/134 |
| 7,456,614 | B2 | * | 11/2008 | Sato et al. | 320/134 |
| 7,508,171 | B2 | * | 3/2009 | Carrier et al. | 320/138 |
| 7,800,342 | B2 | * | 9/2010 | Kobayashi et al. | 320/118 |
| 7,847,512 | B2 | * | 12/2010 | Carroll | 320/101 |
| 7,990,109 | B2 | * | 8/2011 | White et al. | 320/136 |
| 8,111,038 | B2 | * | 2/2012 | Wang et al. | 320/104 |
| 8,358,108 | B2 | * | 1/2013 | Seman et al. | 320/134 |
| 8,541,979 | B2 | * | 9/2013 | Firehammer et al. | 320/118 |
| 2007/0268000 | A1 | * | 11/2007 | Kobayashi et al. | 320/118 |
| 2011/0012560 | A1 | * | 1/2011 | Sakakibara | 320/118 |
| 2011/0140665 | A1 | * | 6/2011 | Tamezane et al. | 320/118 |

FOREIGN PATENT DOCUMENTS

| | | |
|---|---|---|
| JP | 2008-199798 | 8/2008 |
| JP | 2010-166811 | 7/2010 |

* cited by examiner

*Primary Examiner* — M'Baye Diao
(74) *Attorney, Agent, or Firm* — Sherr & Jiang, PLLC (57) ABSTRACT

A discharge control apparatus includes: two or more battery packs equipped with a secondary battery; and a main control unit controlling discharge from the battery packs, in which the two or more battery packs are controlled such that at least one of the battery packs selected by the main control unit discharges, and when switching the battery packs so that only the selected battery pack discharges, the main control unit controls switching such that the battery pack after switching discharges and then the battery pack before switching stops discharge.

6 Claims, 8 Drawing Sheets

DISCHARGE CONTROL APPARATUS AND DISCHARGE CONTROL METHOD

BACKGROUND

The present disclosure relates to a discharge control apparatus and discharge control method.

A battery server that accumulates electricity is being developed. The accumulated electricity is carried and used by a user. The basic configuration of the battery server is later described. For example, the battery server includes a power source unit including a control module that controls charging of a battery when the battery is charged with power supplied from the outside, and a control module that controls output of the power accumulated in the battery.

The battery module disposed in the battery server may be divided into two or more sub-battery modules in some cases to dynamically increase/decrease the battery capacity. The sub-battery modules are connected in parallel through diodes.

SUMMARY

When only one battery module is disposed in a battery server, any particular process is not necessary to control discharge from the battery module. However, in order to dynamically increase/decrease the battery capacity, it is necessary to dispose two or more detachable battery modules in a server.

Further, there is a problem in that it is difficult to suitably control discharge from two or more battery modules, for example, in order to dynamically increase/decrease the battery capacity. When two or more battery modules are used being connected to a battery server, the battery modules may be connected through diodes and electronic switches, but when the battery modules are merely connected in this way, the power supply from the battery module is temporarily stopped when the electronic switch is operated.

Japanese Unexamined Patent Application Publication No. 2010-166811 discloses a technology including two or more built-in battery modules, in which it is difficult to simultaneously discharge from the battery modules. Japanese Unexamined Patent Application Publication No. 2008-199798 discloses a technology of a charging/discharging apparatus in which only one battery module discharges.

It is desirable to provide a new and improved discharge control apparatus and a discharge control method in which battery modules that discharge power are capable of being switched without stopping power supply when two or more battery modules discharge.

A discharge control apparatus according to an embodiment of the present disclosure includes: two or more battery packs equipped with a secondary battery; and a main control unit controlling discharge from the battery packs, in which the main control unit controls the two or more battery packs such that at least one of the battery packs selected by the main control unit discharges, and when switching the battery packs so that only the selected battery pack discharges, the main control unit controls switching such that the battery pack after switching discharges and then the battery pack before switching stops discharge.

The battery packs may each include a control unit controlling stopping and starting of discharge from the secondary battery on the basis of the switching control of the main control unit.

The battery packs may each include a first switch and a second switch that open or close by the control of the control unit to stop or start discharge from the secondary battery and a diode that is disposed at a side of the first switch and prevents power from another battery pack from flowing inside.

The battery packs may each include a first DC-DC converter and a second DC-DC converter that start or stop operation by the control of the control unit to stop or start discharge from the secondary battery and a diode that is disposed at a side of the first DC-DC converter and prevents power from another battery pack from flowing inside.

The main control unit may control the two or more battery packs to simultaneously discharge.

Further, a discharge control method according to another embodiment of the present disclosure, in a discharge control apparatus including two or more battery packs equipped with a secondary battery, and a main control unit controlling discharge from the battery packs, the method includes: controlling the two or more battery packs such that at least one of the battery packs selected by the main control unit from the two or more battery packs discharges, and causing the battery pack after switching to discharge and then causing the battery pack before switching to stop discharge by the main control unit, when switching the battery packs such that only the selected battery pack discharges.

Further, a discharge control apparatus according to another embodiment of the present disclosure includes a main control unit controlling discharge from two or more battery packs equipped with a secondary battery, the main control unit controlling the two or more battery packs such that at least a selected one of the battery packs discharges, when switching a target battery pack that discharges so that only the selected battery pack discharges, causing the battery pack after switching to discharge, and then stopping discharge from the battery pack before switching.

As described above, according to the present disclosure, it is possible to provide a new and improve discharge control apparatus and a discharge control method in which battery modules that discharge power are capable of being switched without stopping power supply when two or more battery modules discharge.

DETAILED DESCRIPTION OF EMBODIMENTS

Hereinafter, preferable embodiments of the present disclosure will be described in detail with reference to the accompanying drawings. Further, in the specification and the drawings, like reference numerals are given to components having substantially the same functional configuration and repetitive description is not provided.

The description is provided in the following order.
<1. Discharge Control Apparatus of Related Art>
<2. Embodiment of Present Disclosure>
[2-1. Configuration of Battery Server]
[2-2. Operation of Battery Server]
<3. Conclusion>

1. DISCHARGE CONTROL APPARATUS OF RELATED ART

An example of the configuration of a discharge control apparatus of the related art and problems in the discharge control apparatus of the related art are described first before preferred embodiments of the present disclosure are described.

Figure 7:
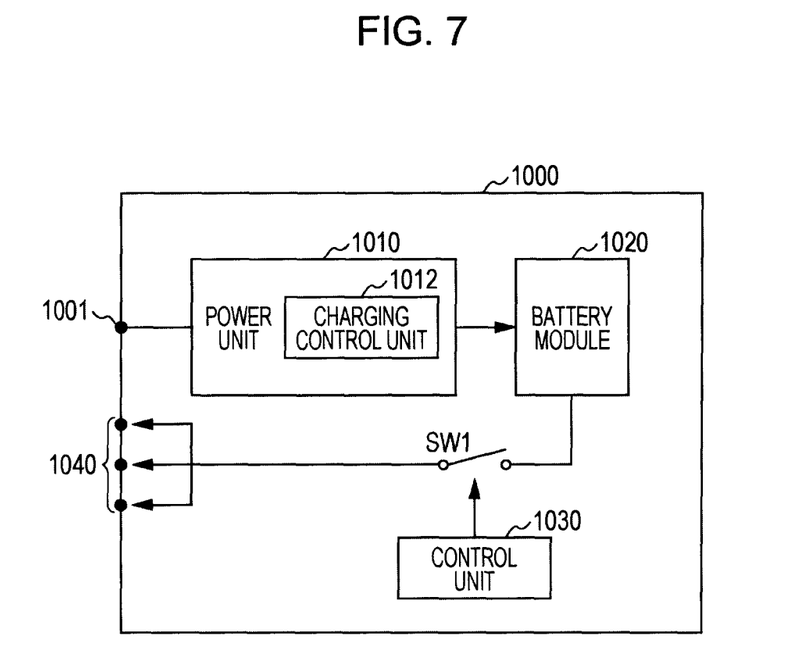
FIG. 7 is an illustrative diagram showing an example of the configuration of a battery server that is an example of a discharge control apparatus of the related art.
Figure 8:
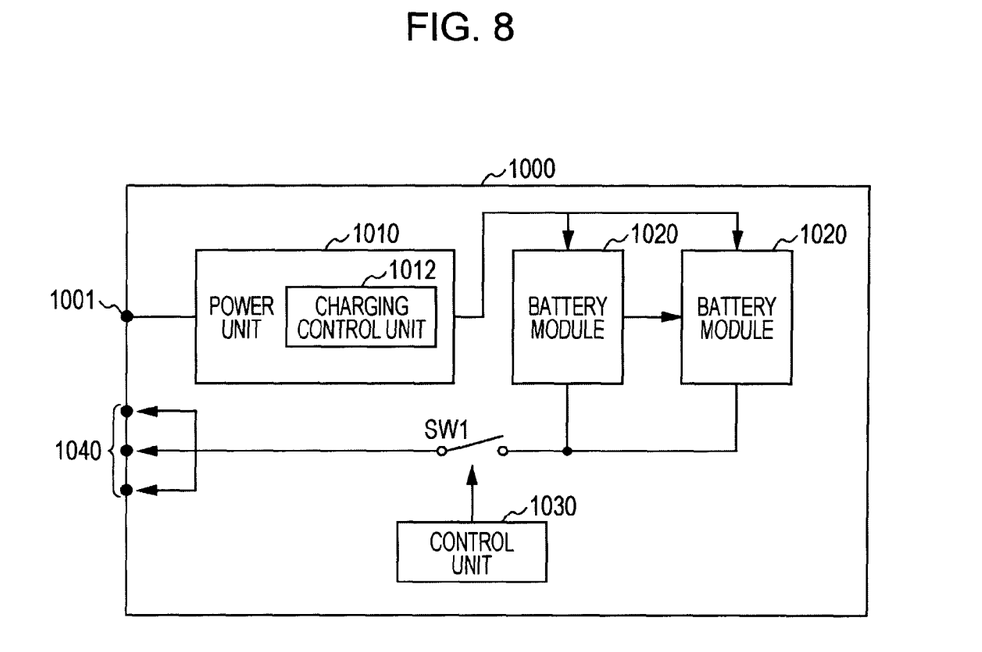
FIG. 8 is an illustrative diagram showing an example of the configuration of a battery server that is an example of a discharge control apparatus of the related art.
Figure 9:
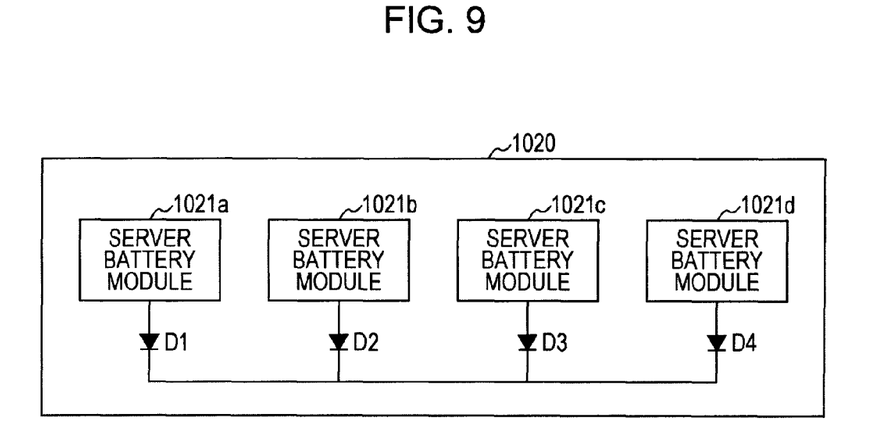
FIG. 9 is an illustrative diagram showing an example of the configuration of a battery module of the related art.

FIGS. 7 to 9 are illustrative diagrams showing an example of the configuration of a battery server 1000 that is an example of a discharge control apparatus of the related art. As shown in FIG. 7, the battery server 1000 of the related art includes an AC/DC input terminal 1001, a power source unit 1010, a battery module 1020, a control unit 1030, and a universal DC output terminal 1040.

The AC/DC input terminal 1001 is a terminal that inputs power generated outside the battery server 1000. The power may be generated from an electric generation plant by an electric power company, or may be generated by an electric generation apparatus using renewable energy, such as photovoltaic power generation or wind force power generation, or from unsustainable energy, such as manpower. Power input to the AC/DC input terminal 1001 is transmitted to the power source unit 1010.

The power source unit 1010 performs processes, such as AC-DC conversion, rectification, and boosting on the power input to the AC/DC input terminal 1001 so as to charge the battery module 1020. The power source unit 1010 includes a charging control unit 1012, as shown in FIG. 7. The charging control unit 1012 controls charging of the battery module 1020. The control of charging performed by the charging control unit 1012 may be, for example, a CCCV charging process.

The battery module 1020 is a module equipped with a secondary battery, which is chargeable and dischargeable, therein, and can accumulate a predetermined amount of power therein. Although one battery module is connected to one battery server 1000 in FIG. 7, two or more battery modules may be connected to one battery server 1000, as shown in FIG. 8. Further, the battery module 1020, as shown in FIG. 9, may be divided into sub-battery modules 1021a to 1021d. The sub-battery modules 1021a to 1021d are connected in parallel through diodes D1 to D4, respectively.

The charging control unit 1012 simultaneously charges the sub-battery modules 1021a to 1021d, when the sub-battery modules 1021a to 1021d are disposed in the battery module 1020. Alternatively, the charging control unit 1012 may charge only one sub-battery module and then charge another sub-battery module after charging the one sub-battery module or charging up to a predetermined amount.

The control unit 1030 controls turning on/off of a switch SW1 which is implemented by a MOSFET or the like to output the power accumulated in the battery module 1020 from the universal DC output terminal 1040. When the power accumulated in the battery module 1020 is output from the universal DC output terminal 1040, the power is output without the voltage being changed or output after being converted to a predetermined voltage (for example, 48 V).

The universal output terminal 1040 is provided to supply the power accumulated in the battery module 1020 to the outside of the battery server 1000. The power accumulated in the battery module 1020 is output from the universal DC output terminal 1040 by connecting a cable to the universal DC output terminal 1040 and turning on the switch SW1 by operating the control unit 1030 in a predetermined way.

The battery server 1000 that is an example of a discharge control apparatus of the related art has a configuration as described above. When only one battery module is disposed in the battery server, any particular process is not necessary for discharge control from the battery module. However, when two or more battery modules are connected to dynamically increase/decrease the battery capacity, there is a problem in that it is difficult to suitably control discharge from the battery modules.

When two or more battery modules are connected to a battery server and used, the battery modules may be connected through diodes and electronic switches, but when the battery modules are connected in this way, the power supply from the battery module is temporarily stopped when an electronic switch is operated.

In the following embodiment of the present disclosure, a battery server and a discharge control method are described in which two or more battery modules that discharge are switched without stopping power when transmitting electricity from the battery modules.

2. EMBODIMENT OF PRESENT DISCLOSURE

2-1. Configuration of Battery Server

Figure 1:
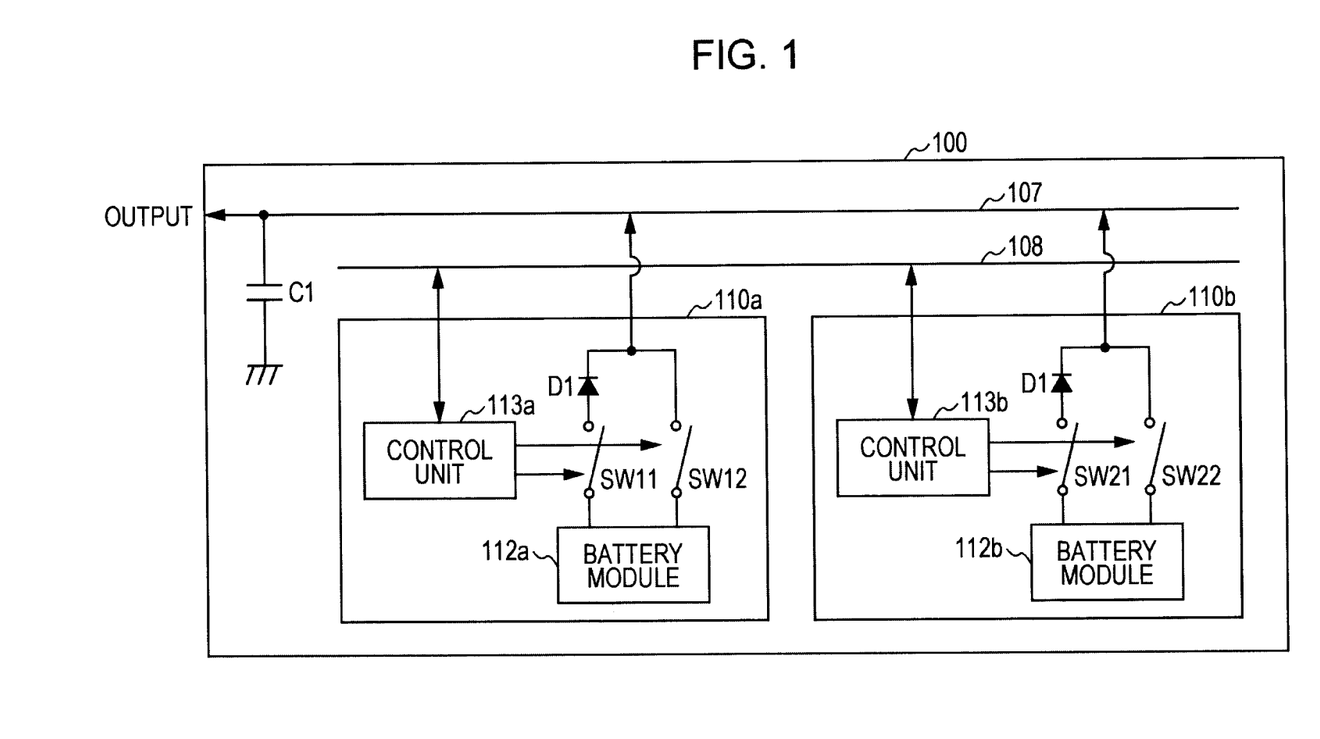
FIG. 1 is an illustrative diagram showing the configuration of a battery server according to an embodiment of the present disclosure.

FIG. 1 is an illustrative view showing the configuration of a battery server 100 according to an embodiment of the present disclosure, as an example of a discharge control apparatus of the present disclosure. Hereinafter, the configuration of the battery server 100 according to an embodiment of the present disclosure is described with reference to FIG. 1. For convenience of description, FIG. 1 shows only the configuration for controlling discharge from a battery pack and the detailed configuration of the battery server 100 is described below.

As shown in FIG. 1, the battery server 100 according to an embodiment of the present disclosure includes a discharge line 107, an information communication line 108, and battery packs 110a and 110b.

The discharge line 107 is a line for discharging power accumulated in the battery packs 110a and 110b to the outside of the battery server 100. The information communication line 108 is a communication line for the battery packs 110a and 110b. The battery packs 110a and 110b turn on/off the switches therein on the basis of the information transmitted through the information communication line 108. Accordingly, it is possible to switch the battery modules that discharge, without stopping power when transmitting power from the battery modules.

The battery packs 110a and 110b are equipped with the battery modules therein and accumulate and discharge power. The battery packs 110a and 110b may be detachably attached to the batter server 100 and may be separated from the battery server 100 to be used when the battery modules are finished charging. Although two battery packs are shown in FIG. 1, the number of battery packs disposed in the battery server 100 is not limited to the example.

In the battery server 100 shown in FIG. 1, the battery packs 110a and 110b respectively include battery modules 112a and 112b, control units 113a and 113b, and switches SW11, 12, 21, and 22, and each include a diode D1.

The battery modules 112a and 112b are implemented by secondary batteries and discharge accumulated power to the outside, when the switches SW11, 12, 21, and 22 are turned on by the control units 113a and 113b. The battery modules may be configured to output the power after converting it at a predetermined voltage through a DC-DC converter. That is, the DC-DC converter may be disposed between the switch and the battery module.

The control units 113a and 113b control turning on/off of the switches SW11, 12, 21, and 22 to discharge the power accumulated in the battery modules 112a and 112b to the outside of the battery packs 110a and 110b. The control units 113a and 113b communicate through the information communication line 108 so as to control turning on/off of the switches SW11, 12, 21, and 22 on the basis of the communication result performed through the information communication line 108.

For example, the case where power is being supplied from the battery pack 110a is considered here. In this case, the switch SW11 of the battery pack 110a is turned off and the switch SW12 is turned on. Needless to say, the switches SW21 and 22 of the battery pack 110b are both turned off.

Here, the case where the source supplying power is switched to be connected to the battery pack 110b from the battery pack 110a is considered. In this case, an instruction is given from the upper level to the control unit 113a of the battery pack 110a through the information communication line 108. The control unit 113a receiving the instruction from the upper level first turns on the switch SW11 and then turns off the switch SW12.

Although the switches SW11 and SW12 are both temporarily turned on when the switch SW11 is turned on, the side of the battery module 112a that is connected to the switch SW11 has a lower output voltage than the side that is connected to the switch SW12, and therefore a reverse bias is not applied to the battery module 112a. Further, since the switch SW12 is immediately turned off, the time during which both switches SW11 and SW12 remain turned on is short.

The voltage of the power that is supplied to the outside drops slightly across a diode D1, but the reduction is compensated for by a capacitor C1 downstream.

Subsequently, an instruction is given to the control unit 113b of the battery pack 110b from the upper level. The control unit 113b receiving the instruction turns on the switch SW21. Next, an instruction of turning off the switch SW11 is given to the control unit 113a of the battery pack 110a from the upper level. Power supply from the battery pack 110a is stopped.

Accordingly, power is output from the battery pack 110b through the diode D1. Thereafter, an instruction is given from the upper level, and the switch SW22 of the battery pack 110b is turned on and the switch SW21 is finally turned off. In this case also, there is a time when both the switch SW21 and switch SW22 keep turned on in the battery pack 110b, but reverse bias is not applied to the battery module 112b.

When the switches are operated as described above, voltage is reduced by the diode D1 in the operation, but both the battery modules 112a and 112b are not directly connected. Therefore, it is possible to prevent deterioration and inconvenience due to reverse bias that is applied to the battery modules 112a and 112b.

Therefore, since the battery packs 110a and 110b have the configuration shown in FIG. 1, power supply does not stop even if the source of power supply is switched.

The summary of the configuration of the battery server 100 according to an embodiment of the present disclosure was described above with reference to FIG. 1. Next, the configuration of the battery server 100 according to an embodiment of the present disclosure is described in more detail.

Figure 2:
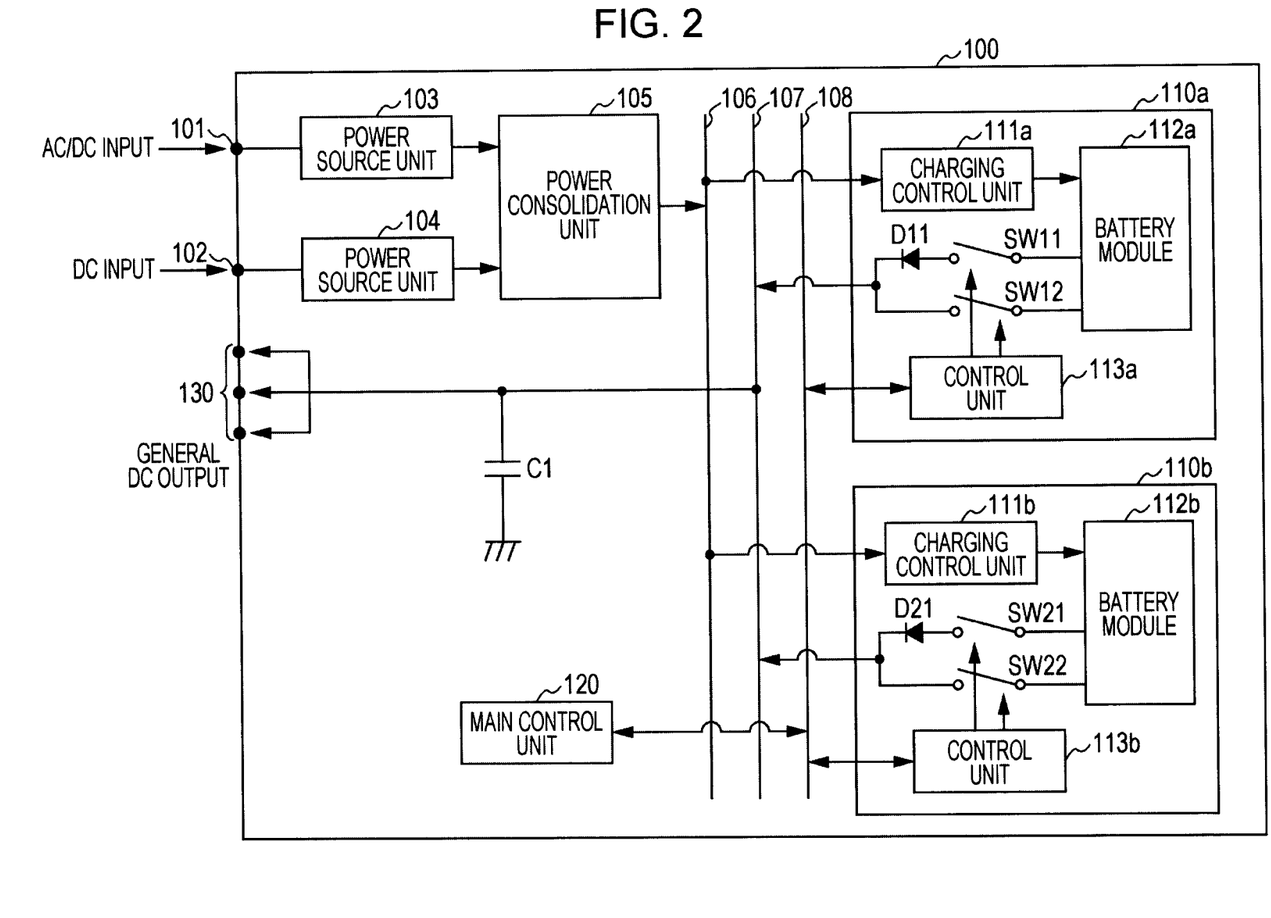
FIG. 2 is an illustrative diagram showing the configuration of the battery server according to an embodiment of the present disclosure.

As shown in FIG. 2, the battery server 100 according to an embodiment of the present disclosure includes an AC/DC input terminal 101, a DC input terminal 102, power source units 103 and 104, a power integration unit 105, a charge line 106, a discharge line 107, an information communication line 108, battery packs 110a and 110b, a main control unit 120, and a universal DC output terminal 130.

The AC/DC input terminal 101 is a terminal that inputs power generated outside the battery server 100. The power may be generated from an electric generation plant by an electric power company, or may be generated by an electric generation apparatus using renewable energy, such as photovoltaic power generation or wind force power generation, or from unsustainable energy, such as manpower. Power input to the AC/DC input terminal 101 is transmitted to the power source unit 103. Although the AC/DC input terminal 101 is herein a common terminal for AC and DC, independent terminals may be disposed for AC and DC.

The DC input terminal 102 is a terminal that inputs power generated outside the battery server 100. Power input to the DC input terminal 102 is power mainly generated by an electric generation apparatus using renewable energy, such as photovoltaic power generation or wind force power generation, or from unsustainable energy, such as manpower. The power input to the DC input terminal 102 is transmitted to the power source unit 104.

Although two terminals are provided for receiving the input of power in the battery server 100 shown in FIG. 2, the number of terminals for receiving the input of power is not limited to the example in the present disclosure.

The power source unit 103 performs processes, such as AC-DC conversion, rectification, and boosting on the power input to the AC/DC input terminal 101 to charge the battery packs 110a and 110b. Further, the power source unit 104 performs processes, such as rectification, and boosting on the power input to the DC input terminal 102 to charge the battery packs 110a and 110b.

In the power source units 103 and 104, the maximum power is achieved by using an MPPT (Maximum Power Point Tracker) and then adjusted at a predetermined voltage.

The power that has undergone various processes in the power source units 103 and 104 is output to the power integration unit 105. Although the battery server 100 shown in FIG. 2 includes two power source units 103 and 104, the present disclosure is not limited to the example in the present disclosure and the power source units are disposed depending on the terminals for receiving the input of power.

The power integration unit 105 integrates the power output from the power source units 103 and 104 and outputs the integrated power. Although the detailed configuration of the power integration unit 105 is described later, for example, it combines the power output from the power source units 103 and 104 through capacitors and/or diodes. The power combined by the power integration unit 105 is supplied to the battery packs 110a and 110b by the control of the main control unit 120. When only one power source unit is disposed in the battery server 100, the power integration unit 105 may not be necessary.

The charge line 106 is a power line for supplying the power integrated and output by the power integration unit 105 to the battery packs 110a and 110b. The discharge line 107 is a power line for outputting power accumulated in the battery packs 110a and 110b from the universal DC output terminal 130. The information communication line 108 is a communication line for communicating information between the main control unit 120 and the control units 113a and 113b respectively included in the battery packs 110a and 110b.

The battery packs 110a and 110b are equipped with the battery modules and allow accumulation and discharge of power. The battery packs 110a and 110b may be detachably attached to the battery server 100 and may be separated from the battery server 100 to be used when the battery modules are finished being charged. Although two battery packs are shown in FIG. 2, the number of battery packs disposed in the battery server 100 is not limited to the example.

As shown in FIG. 2, the battery packs 110a and 110b respectively include charging control units 111a and 111b, battery modules 112a and 112b, control units 113a and 113b, switches SW11, SW12 and SW21, SW22, and diodes D11 and D21.

The charging control units 111a and 111b control charging of the battery modules 112a and 112b by receiving the power supplied from the power integration unit 105 through the charge line 106 and supplying the power to the battery modules 112a and 112b.

The battery modules 112a and 112b are implemented by secondary batteries and accumulate the power supplied from the charging control units 111a and 111b, and discharge the accumulated power to the outside, when the switches SW11, SW12 and SW21, SW22 are turned on by the control units 113a and 113b. The battery modules 112a and 112b may be divided into two or more sub-battery modules, if necessary. Further, the battery used herein may be any one of a lithium ion battery, a nickel hydrogen battery, a lead battery, and a common secondary battery (battery cell). The configuration of the battery module and the sub-battery module may be implemented by any one of series or parallel connection of two or more battery cells.

The control units 113a and 113b control turning on/off of the switches SW11, SW12 and SW21, SW22 to discharge the power accumulated in the battery modules 112a and 112b to the outside of the battery packs 110a and 110b. The control units 113a and 113b communicate with the main control unit 120 so as to control turning on/off of the switches SW11, SW12 and SW21, SW22 on the basis of the communication result with the main control unit 120.

The main control unit 120 controls the operation of the battery server 100. Specifically, the main control unit 120 constantly monitors the power input to the power integration unit 105. The main control unit 120 measures the voltage of a capacitor and the amount of current flowing through the diode when monitoring the power input to the power integration unit 105. Accordingly, the main control unit 120 calculates the amount of power input to the power integration unit 105. The main control unit 120 may perform A/D conversion on parameters to be measured and calculate the amount of power by using the parameters that are acquired as digital values.

Subsequently, the main control unit 120 supplies the entire input power to the battery packs 110a and 110b. More specifically, for example, when power of 300 W is acquired, as a result of monitoring the power input to the power integration unit 105, it is determined to supply 200 W to the battery pack 110a and 95 W to the battery pack 110b and the main control unit 120 gives an instruction to the battery packs 110a and 110b through the information communication line 108. The battery packs 110a and 110b receiving the instructions receive the power assigned thereto and charge the battery modules 112a and 112b therein.

In this case, it is desirable that the main control unit 120 gives an instruction of supplying power a little smaller than the total power that can be supplied (for example, about 90% to 95% of the entire power input to the power integration unit 105). This is because when the power amount is large, the load increases accordingly and power becomes insufficient. Further, a disadvantage occurs, if the output voltages of the power source units 103 and 104 do not completely match each other. This is because power can be received only from the power source unit at a higher voltage. In practice, it is difficult to make the output voltages of the power source units 103 and 104 completely the same. However, for example, even if the output voltage of the power source unit 103 is slightly higher than the output voltage of the power source unit 104, when considering total power of 295 W is received, the output of both the power source units match each other. That is, power is consumed first by the side at a higher voltage. When a voltage equal to or higher than the output of the power source unit at the higher voltage is taken out, the voltage of the side at the higher voltage decreases, and consequently, the output voltages of the two power source units 103 and 104 become the same. Accordingly, the composite power is output from the two power source units. That is, when the power source units 103 and 104 are designed to output voltages equal to each other to some extent, power from the two power source units are combined in the power integration unit 105.

The universal DC output terminal 130 is a terminal that outputs power accumulated in the battery packs 110a and 110b to the outside of the battery server 100. Although a DC output terminal is provided as a terminal that outputs power to the outside of the battery server 100 in the battery server 100 according to the embodiment, the present disclosure is not limited to the example.

Figure 3:
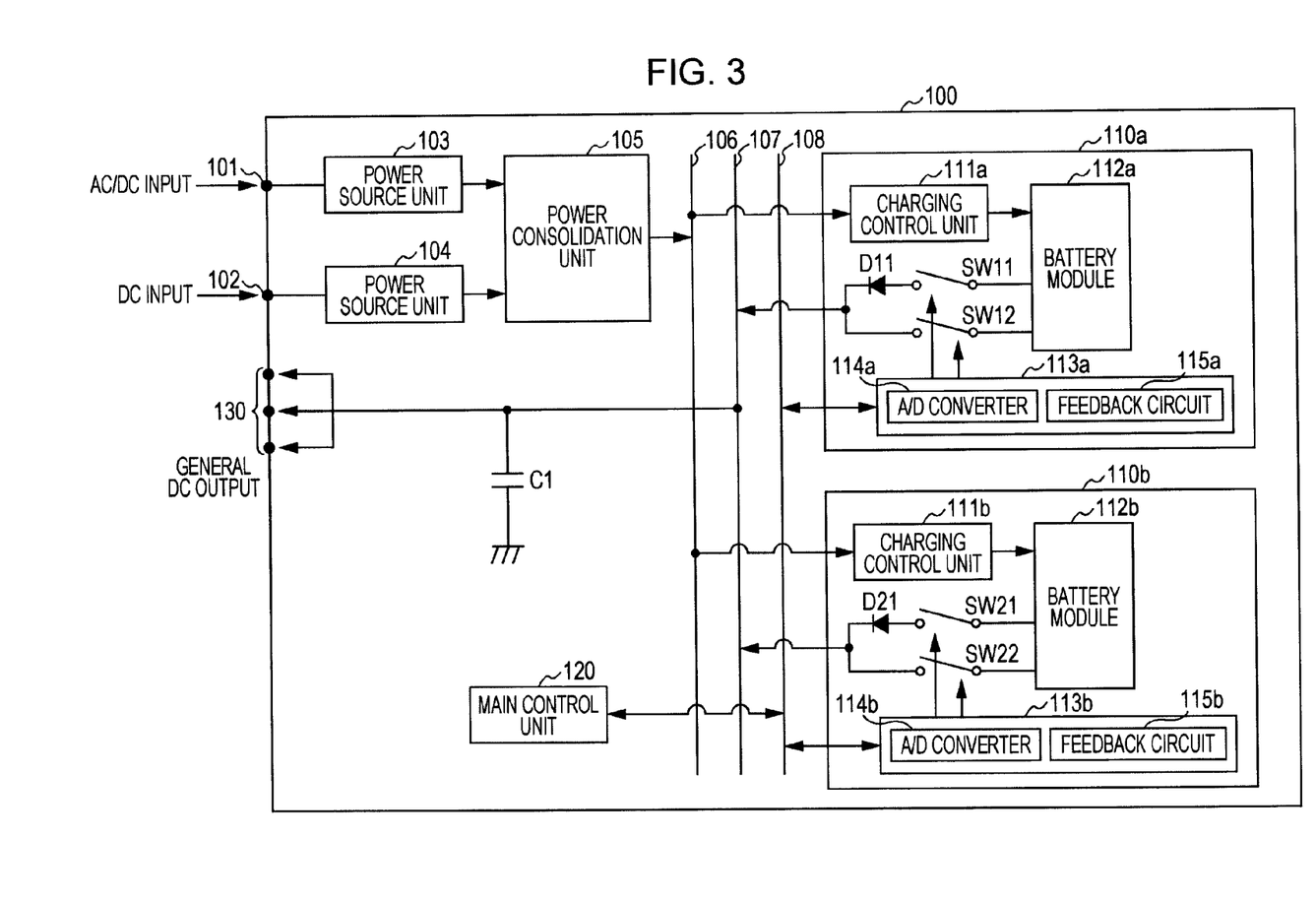
FIG. 3 is an illustrative diagram showing another example of the configuration of the battery server according to an embodiment of the present disclosure.

Next, examples of another configuration and operation of the battery server 100 according to an embodiment of the present disclosure are described. FIG. 3 is an illustrative diagram showing another example of the configuration of the battery server 100 according to an embodiment of the present disclosure. Compared with the battery server 100 shown in FIG. 2, the battery server 100 shown in FIG. 3 is different in that the control units 113a and 113b of the battery packs 110a and 110b respectively include A/D converters 114a and 114b that monitor the voltage or the amount of current flowing to the battery packs 110a and 110b and feedback circuits 115a and 115b that feedback the amount of power supplied to the battery packs 110a and 110b to the main control unit 120.

In the battery server 100 shown in FIG. 3, the main control unit 120 designates a charging ratio for the battery packs 110a and 110b when the battery packs 110a and 110b are charged. When two battery packs 110a and 110b are connected to the battery server 100, as shown in FIG. 3, electricity is generated outside the battery server 100 and power is supplied to the battery server 100. The battery packs 110a and 110b start to be charged in accordance with the charging ratio designated by the main control unit 120. For example, when the main control unit 120 designates the charging ratio of the battery packs 110a and 110b at 2:1 and power of 300 W is generated and supplied to the battery server 100, the battery packs 110a and 110b gradually receive power from the generated power and are charged. The battery packs 110a and 110b change the timing for receiving the power from the power integration unit 105 in synchronization with each other.

Further, the main control unit 120 designates the increase amount of power in charging for the battery packs 110a and 110b. For example, the main control unit 120 determines the increase amount by 20 W for the battery pack 110a and by 10 W for the battery pack 110b.

When power of 300 W is generated and the power of the battery pack 110a reaches 200 W and the power of the battery pack 110b reaches 100 W (this state is referred to as a "stationary state"), the main control unit 120 changes charging of the battery packs 110a and 110b to a self-adjusting mode. For example, when the battery packs 110a and 110b are charged at a level above the amount of electricity generated, the voltage supplied from the power integration unit 105 decreases. The control units 113a and 113b detect the decrease in supplied power by using the A/D converters 114a and 114b and the voltage is adjusted by the feedback circuits 115a and 115b through feedback.

That is, the amount of power synchronously increases from the start to the stationary state and the battery packs 110a and 110b autonomously operate, when the amount of power exceeds the voltage supplied from the power integration unit 105. The supposed voltage of the power integration unit 105 is determined in advance and the supposed voltage is constantly output. When load equal to or more than the generated power is applied, the output voltage of the power integration unit 105 decreases, which is detected by the control units 113a and 113b and the battery packs adjust the amount of current to fit to the output voltage of the power integration unit 105.

Another example is described. For example, when the battery server 100 is charging only the battery pack 110a, the battery pack 110b may be added to the battery server 100 and also charged. It is assumed that the amount of power generation is 300 W and the battery pack 110a has received power of 200 W in advance. Accordingly, when the charging ratio of the battery packs 110a and 110b is 2:1, the main control unit 120 charges the battery pack 110b up to 100 W. For example, the main control unit 120 checks the power that is currently consumed by the battery pack 110a by communication or detects it by using a sensor and indicates the battery pack 110b of the value of receiving power therefor in accordance with the charging ratio.

When there is no problem even if load of up to 100 W is applied to the battery pack 110b, the main control unit 120 implements a self-adjusting mode where the battery packs 110a and 110b autonomously adjust the power. Meanwhile, if the potential of the power integration unit 105 drops before the load of 100 W is applied, the main control unit 120 decreases the load of the battery pack 110a. For example, if the potential of the power integration unit 105 drops when a load of 90 W is applied to the battery pack 110b, the main control unit 120 changes the load of the battery pack 110 to 180 W. Thereafter, the battery packs 110a and 110b autonomously adjust the power at the predetermined charging ratio.

The charging ratio of the battery packs may be changed after being determined. For example, when the charging ratio of the battery packs 110a and 110b is determined at 2:1 and the power of the battery packs 110a and 110b is in the stationary state, the charging ratio may be changed to 1:1. In this case, the receiving power of the battery pack at the higher level is fitted to the lower side. That is, the receiving power of both the battery packs becomes 100 W. Thereafter, it is possible to supply power by 150 W while increasing the power of both the battery packs synchronously.

Next, when the power supplying to the battery server 100 is changed is considered. For example, when power obtained by photovoltaic power generation is being supplied, the solar light may be changed in some cases. When it is clear and more power is generated, the battery packs autonomously increase the receiving power. The output power of the power integration unit 105 is monitored by the control units 113a and 113b of the battery packs and the power is adjusted. Similarly, the power is monitored and adjusted by the control units 113a and 113b of the battery packs in the same way, even if it is cloudy and power generated by photovoltaic power generation is reduced.

The main control unit 120 may determine priority of the battery packs to be charged instead of designating the charging ratio described above. For example, the main control unit 120 may determine the priority to sequentially charge the battery packs 110a and 110b in this order. In this case, when power remains even if the battery pack 110a at the first order is charged at the maximum speed, the main control unit 120 allows power to be supplied to the battery pack 110b at the second order.

When determining the priority such that the battery packs 110a and 110b are charged in this order, the main control unit 120 communicates with the battery pack 110a at the first order and monitors whether the battery pack 110a starts to be charged at the maximum speed. When the battery pack 110a starts to be charged at the maximum speed and the voltage remains, the main control unit 120 allows the battery pack 110b at the next order in the priority to be charged. If the voltage starts to drop, the main control unit 120 reduces the receiving power of the battery pack 110b. If it is insufficient, the main control unit 120 reduces the receiving power of the battery packs one after the other to zero and can charge first the battery pack of the higher priority.

The configuration of the battery server 100 according to an embodiment of the present disclosure was described above with reference to FIGS. 2 and 3. Next, the operation of the battery server 100 according to an embodiment of the present disclosure is described.

2-2. Operation of Battery Server

Figure 4:
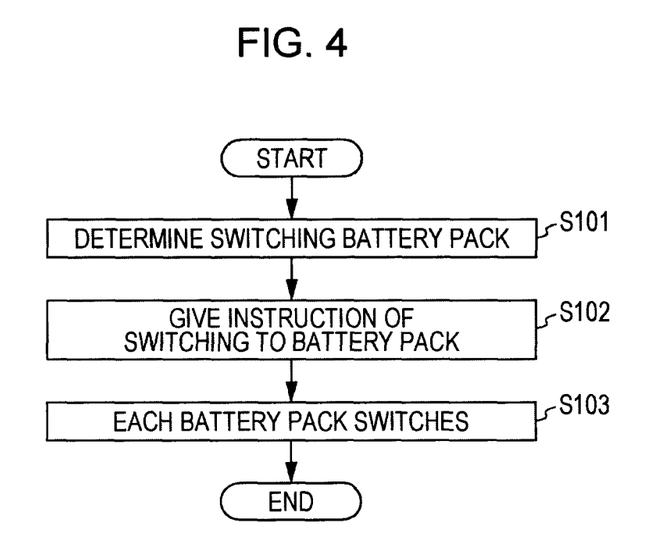
FIG. 4 is a flowchart showing the operation of the battery server according to an embodiment of the present disclosure.

FIG. 4 is a flowchart showing the operation of the battery server 100 according to an embodiment of the present disclosure and showing the operation when the power source of the battery server 100 is switched from the battery pack 110a to the battery pack 110b. Hereinafter, the operation of the battery server 100 according to an embodiment of the present disclosure is described with reference to FIG. 4.

At a certain timing (for example, due to reduction of the accumulation amount), the main control unit 120 determines to switch the power source from the battery pack 110a to the battery pack 110b (Step S101).

In Step S101, when determining to switch the power source from the battery pack 110a to the battery pack 110b, the main control unit 120 sequentially gives an instruction of turning on/off the switches through the information communication line 108, for the battery packs 110a and 110b (Step S102).

In Step S102, when the main control unit 120 gives an instruction of turning on/off the switches through the information communication line 108, for the battery packs 110a and 110b, the battery packs 110a and 110b sequentially turn on/off the switches SW11, SW12, SW21, and SW22 on the basis of the instruction from the main control unit 120 (Step S103).

Figure 5:
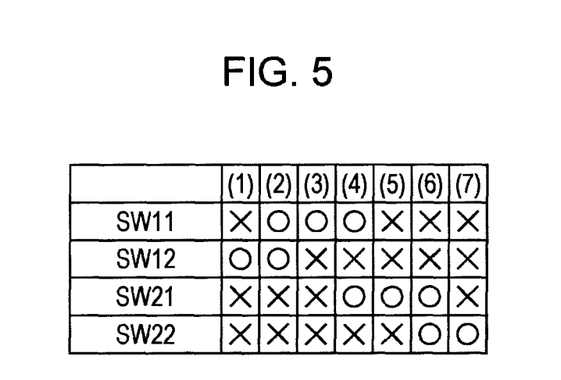
FIG. 5 is an illustrative diagram showing a time series when operating switches disposed in battery packs.

FIG. 5 is an illustrative diagram showing a time series when turning on/off the switches SW11, SW12, SW21, and SW22 disposed in the battery packs 110a and 110b. "○" shows that the switch is turned on and "x" shows that the switch is turned off in the figure.

Only the switch SW12 of the battery pack 110a is first turned on. This shows that power is supplied only from the battery pack 110a.

In this state, the main control unit 120 determines to switch the power source from the battery pack 110a to the battery pack 110b. Accordingly, the main control unit 120 gives an instruction to the battery pack 110a to turn on first the switch SW11 of the battery pack 110a. The battery pack 110a receiving the instruction turns on the switch SW11 that has been turned off.

Next, the main control unit 120 gives an instruction to the battery pack 110a to turn off the switch SW12 of the battery pack 110a. The battery pack 110a receiving the instruction turns off the switch SW12 that has been turned on.

Next, the main control unit 120 gives an instruction to the battery pack 110b to turn on the switch SW21 of the battery pack 110b. The battery pack 110b receiving the instruction turns on the switch SW21 that has been turned off.

Next, the main control unit 120 gives an instruction to the battery pack 110a to turn off the switch SW11 of the battery pack 110a. The battery pack 110a receiving the instruction turns off the switch SW11 that has been turned on. Power supply from the battery pack 110a is stopped. However, since the switch SW21 of the battery pack 110b has been turned on, power remains supplied from the battery pack 110b. Accordingly, the supply of power is not stopped, even though the power source is switched from the battery pack 110a to the battery pack 110b.

When it is necessary to supply power from two or more battery packs, the output is made through a diode as described above. When the output is made through a diode, it is possible to avoid deterioration of the battery modules in the battery packs due to an influence of reverse bias from another battery pack.

Next, the main control unit 120 gives an instruction to the battery pack 110b to turn on the switch SW22 of the battery pack 110b. The battery pack 110b receiving the instruction turns on the switch SW22 that has been turned off.

Finally, the main control unit 120 gives an instruction to the battery pack 110b to turn off the switch SW21 of the battery pack 110b. The battery pack 110b receiving the instruction turns off the switch SW21 that has been turned on.

By controlling the turning on/off of the switches SW11, SW12, SW21, and SW22, as described above, the main control unit 120 can switch the power source from the battery pack 110a to the battery pack 110b without stopping the supply of power from the battery packs 110a and 110b.

The operation of the battery server 100 according to an embodiment of the present disclosure was described above with reference to FIGS. 4 and 5. Next, the configuration of a battery server according to a modified example of the present disclosure is described.

2-3. Modified Example of Battery Server

Figure 6:
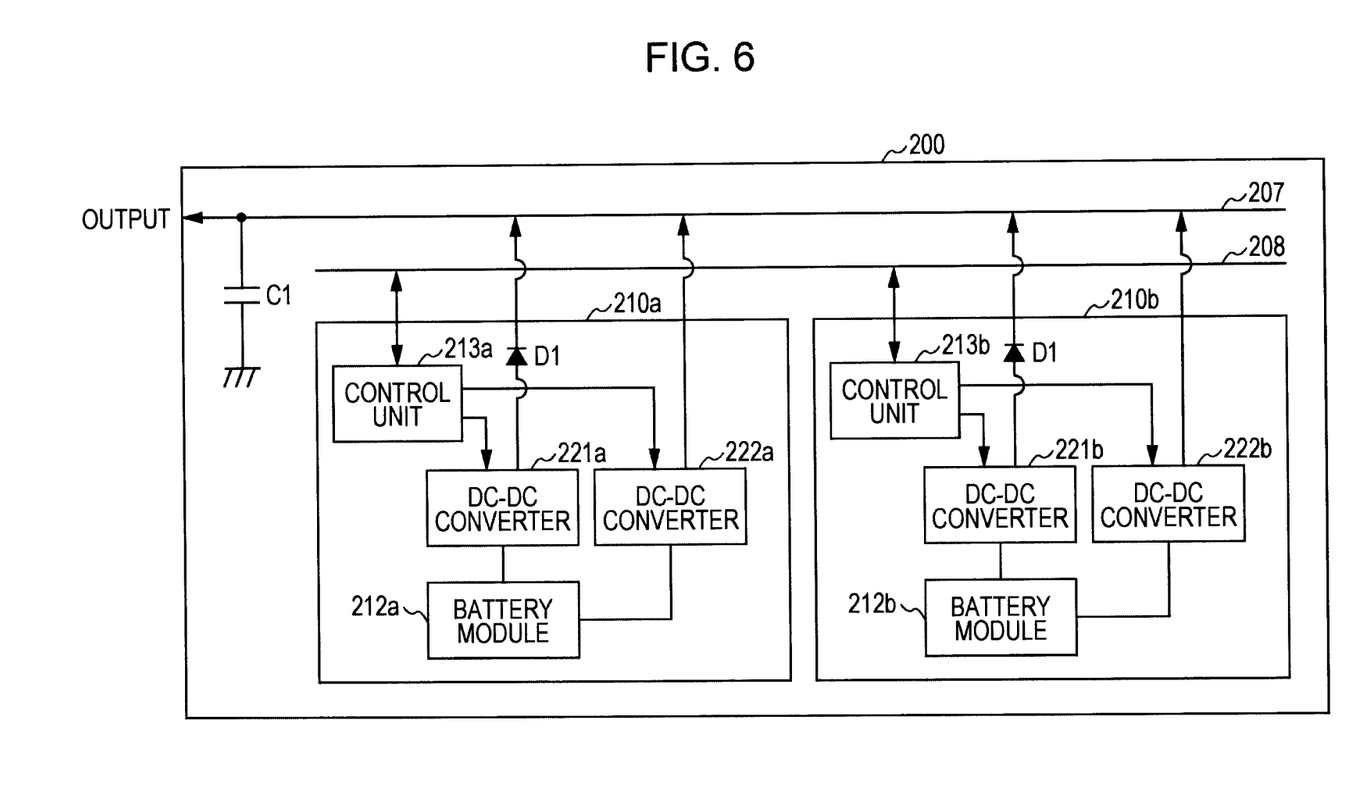
FIG. 6 is an illustrative diagram showing the configuration of the battery server according to a modified example of an embodiment of the present disclosure.

FIG. 6 is an illustrative diagram showing the configuration of a battery server 200 according to a modified example of an embodiment of the present disclosure. Hereinafter, the configuration of the battery server 200 according to a modified example of the present disclosure is described with reference to FIG. 6.

As shown in FIG. 6, the battery server 200 according to a modified example of the present disclosure includes a discharge line 207, an information communication line 208, and battery packs 210a and 210b.

In the battery server 200 shown in FIG. 6, the battery packs 210a and 210b each include a diode D1 and respectively include battery modules 212a and 212b, control units 213a and 213b, and DC-DC converters 221a, 222a and 221b, 222b.

The DC-DC converters 221a, 221b, 222a, and 222b are DC-DC converters having a switch function. The DC-DC converters 221a, 221b, 222a, and 222b can turn on/off the output in accordance with instructions from the control units 213a and 213b.

First, when power is supplied only from the battery pack 210a is considered. In this state, only the DC-DC converter 222a is turned on. Next, the DC-DC converter 221a is turned on and then the DC-DC converter 222a is turned off by the control of the control unit 213a. In this process, the output voltage of the DC-DC converter 221a may be increased corresponding to the output decrease of the diode D1. It may be possible to increase the output voltage after turning off the DC-DC converter 222a or increase the output voltage at the early state.

Subsequently, the DC-DC converter 221b is turned on by the control of the control unit 213b and the DC-DC converter 221a is turned off by the control of the control unit 213a. Further, the DC-DC converter 222b is turned on and the DC-DC converter 221b is turned off finally by the control of the control unit 213b.

Finally, the power source is switched from the battery pack 210a to the battery pack 210b in the above description.

An advantage of the modified example is that voltage is not decreased by the diode D1 and heat is not generated by the electronic switches (heat is usually generated by the current flowing to the MOS-FET). Meanwhile, since the circuit increases in size, it may be possible to remove the DC-DC converters 221a and 221b, and when switching the power source, two DC-DC converters 222a and 222b may be simultaneously turned on and the DC-DC converter where power is cut is then turned off. Accordingly, voltage is not decreased by the diode D1 and it is possible to reduce the size of the circuit. Further, even if both the DC-DC converters 222a and 222b are simultaneously turned on, reverse bias is not applied to the battery modules 212a and 212b and therefore the battery is not deteriorated. In addition, since the output continues, the voltage does not change.

The configuration of the battery server 200 according to a modified example of the present disclosure was described above with reference to FIG. 6.

3. CONCLUSION

As described above, according to an embodiment of the present disclosure, when two or more battery packs are included in the battery server 100 and power is supplied from one of the battery packs, it is possible to keep supplying power without stopping supply of power even if the battery pack that is a power source is switched.

The present disclosure contains subject matter related to that disclosed in Japanese Priority Patent Application JP 2010-287548 filed in the Japan Patent Office on Dec. 24, 2010, the entire contents of which are hereby incorporated by reference.

Although preferred embodiments of the present disclosure were described above in detail with reference to the accompanying drawings, the present disclosure is not limited to the examples. It is apparent that those skilled in the art can modify and change the present disclosure in various ways within the scope described in claims and it should be understood that the modifications and changes are included in the scope of the present disclosure.

What is claimed is:

1. A discharge control apparatus comprising:

two or more battery packs each equipped with a respective secondary battery; and a main control unit controlling discharge from the battery packs, wherein the main control unit controls the two or more battery packs such that at least one of the battery packs selected by the main control unit discharges, and when switching discharging battery packs so that only the selected at least one battery pack discharges, the main control unit controls switching such that one or more battery packs for which the switching has activated a discharging operation begin discharge after switching, and then one or more battery packs for which the switching has deactivated a discharging operation stop discharging, wherein the battery packs each include a respective control unit controlling stopping and starting of discharge from the respective secondary battery on the basis of the switching control of the main control unit.

2. The discharge control apparatus according to claim 1, wherein the battery packs each include a first switch and a second switch that open or close by the control of the respective control unit to stop or start discharge from the respective secondary battery, and a diode that is disposed in series with the first switch and prevents power from another battery pack from flowing inside.

3. The discharge control apparatus according to claim 1, wherein the battery packs each include a first DC-DC converter and a second DC-DC converter that start or stop operation by the control of the respective control unit to stop or start discharge from the respective secondary battery, and a diode that is disposed in series with the first DC-DC converter and prevents power from another battery pack from flowing inside.

4. The discharge control apparatus according to claim 1, wherein the main control unit controls the two or more battery packs to simultaneously discharge.

5. A discharge control method of a discharge control apparatus including two or more battery packs each equipped with a respective secondary battery, and a main control unit controlling discharge from the battery packs, the method comprising:

controlling the two or more battery packs such that at least one of the battery packs selected by the main control unit discharges; and causing, by the main control unit, one or more battery packs for which a discharging operation is to be activated to begin discharge after switching, and then causing one or more battery packs for which a discharging operation is to be deactivated to stop discharging, when switching discharging battery packs such that only the selected at least one battery pack discharges, wherein the battery packs each control, by a respective control unit, stopping and starting of discharge from the respective secondary battery on the basis of the switching control of the main control unit.

6. A discharge control apparatus comprising:

a main control unit controlling discharge from two or more battery packs each equipped with a respective secondary battery, the main control unit controlling the two or more battery packs such that at least a selected one of the battery packs discharges, when switching from one or more battery packs for which a discharging operation is to be deactivated to the at least the selected one of the battery packs as a target battery pack for which a discharging operation is to be activated, and then stopping discharge from the one or more battery packs for which the discharging operation is to be deactivated, wherein the battery packs each control, by a respective control unit, stopping and starting of discharge from the respective secondary battery on the basis of the switching control of the main control unit.

* * * * *